United States Patent [19]

Lindner et al.

[11] 4,111,886

[45] Sep. 5, 1978

[54] PLASTICS COMPOSITIONS WITH HIGHER ALCOHOL ESTERS AS LUBRICANTS AND RELEASE AGENTS

[75] Inventors: Robert Arthur Lindner, Newburgh, N.Y.; Robert James Limon, Bayonne, N.J.

[73] Assignee: Henkel Inc., Teaneck, N.J.

[21] Appl. No.: 881,648

[22] Filed: Feb. 27, 1978

[51] Int. Cl.$^2$ ............................ C08K 5/11; C08K 5/12
[52] U.S. Cl. ............................ 260/31.8 T; 260/31.8 R; 560/76; 560/190
[58] Field of Search ............ 260/31.8 R, 31.8 T, 260/31.8 J, 31.8 AN, 31.8 F, 45.85 T; 560/76, 190

[56] References Cited

U.S. PATENT DOCUMENTS

| | | | |
|---|---|---|---|
| 3,578,621 | 5/1971 | Stapfer | 260/31.8 AN |
| 3,644,246 | 2/1972 | Lozanou | 260/31.8 R |
| 3,981,838 | 9/1976 | Wilson | 560/76 |

*Primary Examiner*—Paul R. Michl
*Attorney, Agent, or Firm*—Hammond & Littell

[57] ABSTRACT

A plastic composition with an external lubricant comprising (a) a polymer selected from the group consisting of phenoplasts and chlorine-containing thermoplastic polymers and (b) a calcium salt of a monoalkyl ester of a dicarboxylic acid where said monoalkyl contains more than 18 but less than 72 carbon atoms and said dicarboxylic acid is selected from the group consisting of succinic acid, glutaric acid, phthalic acid, terephthalic acid and isophthalic acid, where the proportion by weight of said calcium salt to said polymer is from 0.05 to 10.0:100.

16 Claims, No Drawings

PLASTICS COMPOSITIONS WITH HIGHER ALCOHOL ESTERS AS LUBRICANTS AND RELEASE AGENTS

THE PRIOR ART

The production of shaped articles of thermoplastic material is done according to known methods, such as calendering, pressing, continuous casting, or extruding at elevated temperature. The known processing techniques result in many technical problems for which many solutions have been suggested, such as by adding various aids to the plastics. The production of shaped articles of thermosetting material is likewise done according to known methods and likewise requires various processing aids.

A great number of lubricants suggested so far for use in the shaping of thermoplastic and thermosetting materials primarily impart to these materials an improved fluidity. Examples of lubricants previously used for thermoplastic materials include paraffins of various molecular weights and degrees of branching; fatty alcohols, naturally occurring and synthetic; higher molecular aliphatic monocarboxylic acids as well as amides derived from them; and metal soaps and simple esters. Metal soaps are also employed as lubricants in shaping thermosetting materials.

Lubricants known up to now, and particularly the products derived from long-chain aliphatic carboxylic acids, impart an improved fluidity to the thermoplastic materials during the shaping operation, but they do not prevent to a sufficient extent the sticking of the thermoplastics or thermosetting resins to the hot metal parts of the processing machines. Lubricants which impart an improved fluidity to the plastic masses being processed are referred to as "internal lubricants." Lubricants designed to prevent the sticking of plastic masses to hot metal parts of processing machines are referred to as "external lubricants."

An advantage of the above-mentioned metal soap internal lubricants is that they are compatible with thermoplastic materials, such as polyvinyl chloride, vinyl chloride copolymers, other chlorine-containing polymers, and they do not hinder the further processing of semifinished products by welding, pressing, cementing or similar steps. However, the presence of large proportions of these lubricants in thermoplastic compositions results in moldings which are opaque or of impaired transparency and may well separate from the resins during processing.

The same problems, except for the question of transparency occur with processing of the thermosetting resins, particularly the phenoplasts.

Moreover, the conventional "internal lubricants" such as calcium stearate become less effective as the temperature of the plastic mass is increased above 135° C.

Lozanov, U.S. Pat. No. 3,644,246, describes an improved combination for use with chlorine-containing polymers which he claims act both as a stabilizer and as a lubricant. This combination is a mixture of an organo-tin carboxylate and the metal salt of the monoalkyl ester of an unsaturated dicarboxylic acid where the monoalkyl has from 8 to 18 carbon atoms and the unsaturated dicarboxylic acid is maleic acid, fumaric acid, itaconic acid, citraconic acid, mesaconic acid and glutaconic acid. He indicates that these hemi-ester salts, particularly magnesium stearyl maleate give improved stability against heat degradation of vinyl containing polymers. However, the lubricity is not shown to be improved in the Table at the bottom of columns 7 and 8.

Buddemeyer et al U.S. Pat. No. 3,360,375 describe yeast leavened bakery products having incorporated therein a non-toxic mono-aliphatic ester of a dicarboxylic acid of the formula:

wherein $R_1$ is alkyl having 12 to 24 carbon atoms, R is alkylene or alkenylene having 2 to 8 carbon atoms, and Z is hydrogen, alkali metal, alkaline earth metal, ammonium and aluminum. Among the mono-aliphatic esters of a dicarboxylic acid disclosed, is the salt of stearyl succinic acid, where $R_1$ is a $C_{18}$ alkyl and R is ethylene. Applicants make no specific disclosures to esters of alcohols having more than 18 carbon atoms.

Moreover, one skilled in the art would not be led to combine a patent in the field of yeast leavened bakery products with a patent in the lubrication of chlorine-containing polymers.

OBJECTS OF THE INVENTION

An object of the present invention is to develop a plastic composition containing a lubricant with an improved external lubrication effect.

Another object of the present invention is the development of a plastic composition with an improved external lubricant comprising (a) a polymer selected from the group consisting of phenoplasts and chlorine-containing thermoplastic polymers and (b) a calcium salt of a monoalkyl ester of a dicarboxylic acid where said monoalkyl contains more than 18 but less than 72 carbon atoms and said dicarboxylic acid is selected from the group consisting of succinic acid, glutaric acid, phthalic acid, terephthalic acid and isophthalic acid, where the proportion by weight of said calcium salt to said polymer is from 0.05 to 10.0:100.

A further object of the present invention is the development of a process for shaping a polymer selected from the group consisting of phenoplasts and chlorine-containing thermoplastic polymers by incorporating from 0.05% to 10% by weight of a calcium salt of a monoalkyl ester of a dicarboxylic acid where said monoalkyl contains more than 18 but less than 72 carbon atoms and said dicarboxylic acid is selected from the group consisting of succinic acid, glutaric acid, phthalic acid, terephthalic acid and isophthalic acid, into said polymer prior to effecting its shaping.

These and other objects of the invention will become more apparent as the description thereof proceeds.

DESCRIPTION OF THE INVENTION

The above objects have been achieved and the drawbacks of the prior art have been overcome by the discovery that calcium salts of mono-$C_{20-70}$-alkyl esters of certain dicarboxylic acids, particularly succinic acid, glutaric acid and the benzene-dicarboxylic acids, are effective internal lubricants for both phenoplasts and chlorine-containing thermoplastic polymers with an improved external lubrication effect. The weight ratio of the calcium salt to the polymer is 0.05 to 10.0:100, preferably 0.1 to 3.0:100. The use of the calcium salts of the present invention results in better flow properties of the polymer and a better hot metal release. The delay in fusion is also greater than with materials of the prior art.

These properties demonstrate the improved external lubrication effect.

More particularly, therefore, the present invention relates to a plastic composition with an improved external lubricant comprising (a) a polymer selected from the group consisting of phenoplasts and chlorine-containing thermoplastic polymers and (b) a calcium salt of a monoalkyl ester of a dicarboxylic acid where said monoalkyl contains more than 18 but less than 72 carbon atoms and said dicarboxylic acid is selected from the group consisting of succinic acid, glutaric acid, phthalic acid, terephthalic acid and isophthalic acid, where the proportion by weight of said calcium salt to said polymer is from 0.05 to 10.0:100.

In addition, the present invention relates to a process for shaping a polymer selected from the group consisting of phenoplasts and chlorine-containing thermoplastic polymers by incorporating from 0.05% to 10% by weight of a calcium salt of a monoalkyl ester of a dicarboxylic acid where said monoalkyl contains more than 18 but less than 72 carbon atoms and said dicarboxylic acid is selected from the group consisting of succinic acid, glutaric acid, phthalic acid, terephthalic acid and isophthalic acid, into said polymer prior to effecting its shaping.

The phenoplasts which can be employed are the conventional phenol-formaldehyde condensates which undergo thermosetting upon heating. The use of the calcium salt of the invention is particularly effective since the working temperature of the mixing steps and shaping steps is kept well below the thermosetting temperature whereby premature thermosetting is avoided.

The chlorine-containing thermoplastic polymers are preferably homopolymers of vinyl chloride (PVC) copolymers of vinyl chloride with other monoethylenically unsaturated monomers copolymerizable with vinyl chloride, such as ethylene, vinyl acetate, etc., chlorinated polyvinyl chloride, chlorinated polyethylene and mixtures of polyvinyl chloride or copolymers of vinyl chloride with polymers derived from other monoolefinically-unsaturated monomers, such as acrylic acid esters, methacrylic acid esters, acrylonitrile, vinyl esters, oxidized polyethylene, etc.

The calcium salts of mono-$C_{20-72}$-alkyl esters of succinic, glutaric or benzene-dicarboxylic acids are mixed with the polymers to be lubricated in the conventional manner in conventional mixers. They are employed in amounts of from 0.05 to 10.0, preferably 0.1 to 3.0, parts by weight per 100 parts by weight of the polymers to be lubricated. The mixture is then ready to be shaped in a customary manner, followed by thermosetting if a phenoplast was employed.

While any calcium salt of a mono-$C_{20-72}$-alkyl ester of succinic, glutaric or benzene-dicarboxylic acid can be employed, preferably the eicosanyl and docosanyl esters are employed, such as:
calcium eicosanyl succinate
calcium eicosanyl glutarate
calcium eicosanyl phthalate
calcium eicosanyl isophthalate
calcium eicosanyl terephthalate
calcium docosanyl succinate
calcium docosanyl glutarate
calcium docosanyl phthalate
calcium docosanyl isophthalate
calcium docosanyl terephthalate.

Other additives can be added to the polymer blend as required. Thus, for certain purposes antioxidants would be added to protect against oxidative degradation. Other plasticizers can also be used without affecting the properties of the system. Preferably acrylic impact modifiers, such as KM-611 of Rohm and Haas, and acrylic processing acids, such as K 120N of Rohm and Haas, may be employed. Stabilizers, such as organotin mercaptide or organotin mercaptoester can be employed with the lubricating compositions of the present invention. This results in a further improvement in light stability and in particular heat stability. Among the organotin mercaptides that have been found effective are dibutyl tin bis-(laurylmercaptide) and dibutyl tin bis-(hexadecylmercaptide). Typical representatives of the organotin mercaptoesters include dibutyl- and di-n-octyl tin bis-(2-ethylhexyl thioglycollate) and dibutyl- and di-n-octyl tin $\beta$-mercaptopropionate.

The calcium salts of the mono-$C_{20-72}$-alkyl esters of adipic, glutaric or benzene-dicarboxylic acids are prepared by reacting approximately equimolar amounts of a $C_{20-72}$-alkanol with the corresponding acid anhydride and neutralizing the half acid with calcium hydroxide or calcium carbonate. While the salt is described as the calcium salt, it is probably the calcium salt of two mols of the half acid corresponding to the formula:

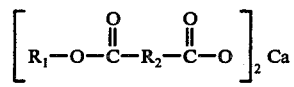

where $R_1$ is a $C_{20-72}$-alkyl and $R_2$ is ethylene, propylene or benzene. The less preferred method of production is to react from 0.5 to 1.0 mol of the $C_{20-72}$-alkanol with one mol of the diacid or diacid chloride under esterification conditions and then neutralizing the half ester, after removal of unreacted acid, with calcium hydroxide.

The $C_{20-72}$-alkanol is preferably straight-chained, although small amounts up to 20% by weight may be branch-chained alkanols, such as Guerbet alcohols. It is also possible to utilize commercially produced alcohol bottoms from the oxidation of paraffins which contain at least 70% by weight of $C_{20+}$-alkanols while the remainder is unreacted paraffin.

The following examples are illustrative of the practice of the invention without being limitative thereof.

EXAMPLES

In the following examples, the various plastic batches were prepared in a conventional mixer, such as a Henschel mixer, under the following schedule:
(a) Turn on steam full 20 pounds/240° F.
(b) Charge resin.
(c) Mix at 3,600 RPM.
(d) Add stabilizer at 150° F.
(e) Add wax at 160° F.
(f) Stop and scrape sides at 170° F.
(g) Add pigment at 180° F.
(h) Add processing aid or impact modifiers at 200° F.
(i) Shut off steam at 220° F. and turn on cold water and scrape side of mixer.
(j) Change RPM to 1,800 and mix while cooling.
(k) Drop batch at 150° F. to 160° F.

After mixing the batches, various tests were conducted on the same. These tests were usually conducted also with the same recipe but with calcium stearate, as a comparison.

The test procedures are as follows:

A. Roll Release Test

Two roll mill conditions
Rolls; 8 inches × 16 inches
Roll; Surface temperature Back roll - 370° F. Front roll - 370° F.
Roll; Speeds Back roll - 23 rpm Front roll - 18.5 rpm
Roll; Friction ratio 1:1.25
Roll; Surface cold chill steel
Stock Temperature - 190° C. or 375° F.

The time, until the rolls no longer released the batch, was measured.

B. P.V.C. Powder Fusion Test — VIA Brabender Plast-O-Corder

Apparatus
Brabender Plasticorder P.
V 300 with 30 ml roller #6 head.
Conditions
Use 30 ml capacity roller mixing head #6
Set temperature; As required 150° C.
Roller speed; 30 RPM
Connector set; As required 1:5
Indicator adjustment; As required 5X
Air cooling pressure; 60 lb./in$^2$
Slide set; As required
Damper set; 8 sec.
Charge; 28 gm
Loading chute; Cold
Ram weight; 15 kilo.
Pre-heat time; 1 minute
Procedure Compound was prepared in Henschel Mixer and aged overnight.

Cold shoot is inserted in throat of mixing head 1.0 minute before test is started.

Sample size is 40 × S.P.G.

Compound is poured in and allowed to pre-heat 0.5 minute before the test is started.

Sample is pressurized with 15 kilo. free falling weight on shoot ram.

The machine is stopped after 15 minutes, the time and torque at fusion, and 10 minutes thereafter is recorded.

C. P.V.C. Powder Fusion Test — VIA Brabender Plast-O-Corder (a variation of B above)

Apparatus
Brabender Plasticorder P.
V 300 with 30 ml roller #6 head.
Conditions
Use 30 ml capacity roller mixing head #6.
Set temperature; As required 140° C.
Roller speed; 30 RPM
Connector set; As required 1:5
Indicator adjustment; As required 5X
Air cooling pressure; 60 lb./in.$^2$
Slide set; As required 0
Damper set; 8 sec.
Charge; 28 gm
Loading chute; Cold
Ram weight; 15 kilo.
Pre-heat time; 1 min.
Procedure Compound was prepared in Henschel Mixer and aged overnight.

Cold shoot is inserted in throat of mixing head 1.0 min. before test is started.

Sample size is 40 × S.P.G.

Compound is poured in and allowed to pre-heat 0.5 min. before the test is started.

Sample is pressurized with 15 kilo. free falling weight on shoot ram.

The machine is stopped after 15 min., the fusion time and torque at fusion, and 10 min. thereafter is recorded.

D. P.V.C. Stability Test — Dynamic Early Color Development

Apparatus
Brabender Plasticorder P.
V 300 with 60 ml roller #6 head. Mold plyer.
Conditions
Use 60 ml capacity roller mixing head #6.
Set temperature; 190° C.
Roller speed; 50 RPM
Connector set; 1:5
Indicator adjustment; 5X
Air cooling pressure; 60 lb./in.$^2$
Slide set; 0
Damper set; 8 sec.
Charge; 65 gm
Loading chute; Cold
Ram weight; 15 kilo.
Pre-heat time; 1 min.
Procedure Compound was prepared in Henschel Mixer and aged overnight.

Cold shoot is inserted in throat of mixing head 1.0 min. before test is started.

Sample size is 65 gm.

Compound is poured in and allowed to pre-heat 0.5 min. before the test is started.

Sample is pressurized with 15 kilo. free falling weight on shoot ram.

The machine is stopped every 5 min. and a sample is extracted with tongs and viewed for color development.

E. P.V.C. Stability Test — Dynamic Early Color Development (A variation of D above)

Apparatus
Brabender Plasticorder P.
V 300 with 60 ml roller #6 head. Mold plyer.
Conditions
Use 60 ml capacity roller mixing head #6.
Set temperature; 190° C.
Roller speed; 60 RPM
Connector set; 1:5
Indicator adjustment; 5X
Air cooling pressure; 60 lb./in.$^2$
Slide set; 0
Damper set; 8 sec.
Charge; 56 gm
Loading chute; Cold
Ram weight; 15 kilo.
Pre-heat time; 1 min.
Procedure Compound was prepared in Henschel Mixer and aged overnight.

Cold shoot is inserted in throat of mixing heat 1.0 min before test is started.

Sample size is 56 gm.

Compound is poured in and allowed to pre-heat 0.5 min. before the test is started.

Sample is pressurized with 15 kilo. free falling weight on shoot ram.

The machine is stopped every 5 min. and a sample is extracted with tongs and viewed for color development.

F. P.V.C. Stability Test — Dynamic Early Color Development (Another variation of D above)

Apparatus
Brabender Plasticorder P.
V 300 with 60 ml roller #6 head. Mold plyer.
Conditions
Use 60 ml capacity roller mixing head #6.
Set temperature; 180° C.
Roller speed; 60 RPM
Connector set; 1:5
Indicator adjustment; 5X
Air cooling pressure; 60 lb./in.$^2$
Slide set; 0
Damper set; 8 sec.
Charge; 62 gm
Loading chute; Cold
Ram weight; 15 Kilo.
Pre-heat time; 1 min.
Procedure
Compound was prepared in Henschel Mixer and aged overnight.
Cold shoot is inserted in throat of mixing head 1.0 min. before test is started.
Sample size is 62 gm.
Compound is poured in and allowed to pre-heat 0.5 min. before the test is started.
Sample is pressurized with 15 kilo. free falling weight on shoot ram.
The machine is stopped every 5 min. and a sample is extracted with tongs and viewed for color development.

G. Evaluation of Thermosets with a Brabender Plasticorder

Apparatus
Plasticorder — Model PL-V 300
Type #6 (Electric)
30 ML capacity
Loading chute — B.F.G. type
Test Conditions
Bowl temperature set; 150° C.
Damper set; 12 sec.
Slide set; 0 kilo.
Scale expansion set; 5:1 (5X)
Chart speed set; 4 cm/min.
Rotor speed set; 40 RPM
Ram weight; 15 kilo.
Pre-heat time; None
Charge weight; 20 X S.P.G.
Procedure
Prepare machine for testing
Clean out old sample.
Close bowl, fill bowl with wood chips while operating.
Allow machine to run with wood fill for 15 minutes.
Clean and allow machine to thermally stabilize for 15 min.
Test
Weigh out sample.
Start temperature and torque recorder.
Place cold shoot in throat one-eighth min. before start of test.
Change sample and slide ram in place.
Drop ram weight.
Record.
Record
Time to maximum melt flow.
Time to melt flow duration.
Torque at maximum melt flow.
Time to crosslinking.
Torque at crosslinking.

H. Method for Making Clarity Plaque
(1) Heat press to 375° C.
(2) Set Brabender Plasticorder to 190° C. - 60 RPM - 1:5 (X5)
(3) Preheat plaque mold for 5 min. in press.
(4) After 5 min. inject 56 gm of the sample into the Brabender Plasticorder. Remove the fused sample after 2 min. and place on the mold in the press.
(5) Apply maximum pressure to mold for 1.25 min.; then remove mold from heat and cool for 5 min.
(6) Remove plaque and trim edges.
(7) Report the clarity.

EXAMPLE 1

This example demonstrates that longer fusion time and extended metal roll release time as well as lower torques are obtained upon using the pure C20+ half succinate in the form of its calcium salt, as compared with Ca stearate.

| Formulations | A | B |
|---|---|---|
| Polyvinyl Chloride Resin "SCC 614 - Stauffer Chem." | 85.0 | 85.0 |
| Acrylic Impact Modifier "KM-611 - Rohm & Haas" | 15.0 | 15.0 |
| Methyl Tin Stabilizer "TM 181 - Cincinnati Millicron" | 2.0 | 2.0 |
| Acrylic Processing Aid "K 120N - Rohm & Haas" | 2.0 | 2.0 |
| TiO$_2$ | 0.2 | 0.2 |
| 158° m.p. Paraffin | 0.2 | 0.2 |
| Ca Stearate | 1.8 | — |
| Ca salt mono-C$_{20+}$-alkyl succinate | — | 1.8 |

Test Results

Where two values are given, these are values of separate tests.

| | A | | B | |
|---|---|---|---|---|
| A. Roll Release | 15 min | | 25 min | |
| B. Powder Fusion Test: | | | | |
| Fusion time (min.) | 1.25 | 1.4 | 4.8 | 5.5 |
| Max. torque (MG) | 2900 | 2950 | 2750 | 2650 |
| Torque 10 min. after fusion | 2600 | 2650 | 2500 | 2500 |
| C. Powder Fusion Test: | | | | |
| Fusion time (min.) | 0.8 | | 2.0 | |
| Max. torque (MG) | 2750 | | 2450 | |
| Torque 10 min. after fusion | 2475 | | 2300 | |

EXAMPLE 2

This example gives the results of the clarity tests conducted on the Brabender to demonstrate that the pure calcium C20+ half succinate provide improved clarity which is probably due to its higher content of polar groups. In addition, early color stability is improved.

| Formulations | A | B |
|---|---|---|
| PVC Resin | 85.0 | 85.0 |
| Acrylic Impact Modifier | 15.0 | 15.0 |
| Methyl Tin Stabilizer | 2.0 | 2.0 |
| Acrylic Processing Aid | 2.0 | 2.0 |
| Ca Stearate | 1.8 | — |
| Ca Salt Mono-$C_{20+}$-alkyl succinate | — | 1.8 |

| Test Results | A Instantaneous | B Instantaneous |
|---|---|---|
| E. PVC Stability Test | | |
| Brabender Fusion | | |
| Max. torque at fusion | 4300 | 4300 |
| Torque 10 min. after fusion | 2050 | 1975 |
| Brabender Stability | | |
| Early color (min.) | 15–20 | 20–25 |
| Final color (min.) | 20–25 | 20–25 |
| H. Clarity Plaque | | |
| A has more haze than B. | | |

EXAMPLE 3

This example shows the improved external lubrication of the calcium mono-$C_{22+}$-alkyl succinate in the longer fusion times and lower torques. Two different industrial grade $C_{22+}$-alkanols were employed in the esterification and the two calcium mono-$C_{22+}$-alkyl succinates were given the codes 8235 and 8271. Experimental sample 8271 was slightly more improved than 8235 but both were much more flowable than the controls, calcium stearate or stearyl stearate.

| Formulation | A | B | C | D |
|---|---|---|---|---|
| PVC resin | 85.0 | 85.0 | 85.0 | 85.0 |
| Acrylic Impact Modifier | 15.0 | 15.0 | 15.0 | 15.0 |
| Methyl Tin Stabilizer | 2.0 | 2.0 | 2.0 | 2.0 |
| Acrylic Processing Aid | 2.0 | 2.0 | 2.0 | 2.0 |
| $TiO_2$ | 3.0 | 3.0 | 3.0 | 3.0 |
| 158° m.p. Paraffin | — | — | 0.2 | 0.2 |
| Ca Stearate | 1.8 | 0.2 | — | — |
| Oxidized Polyethylene | 0.2 | — | — | — |
| Stearyl Stearate | — | 1.8 | — | — |
| Ca Mono-$C_{22+}$-alkyl succinate 8235 | — | — | 1.8 | — |
| Ca Mono-$C_{22+}$-alkyl succinate 8271 | — | — | — | 1.8 |

| Test Results | | | | |
|---|---|---|---|---|
| B. PVC Powder Fusion Test | | | | |
| Fusion Time (min.) | 1.0 | 0.7 | 5.5 | 5.8 |
| Max. Torque at Fusion (MG) | 3000 | 2900 | 2600 | 2650 |
| Torque 10 min. after fusion | 2550 | 2600 | 2500 | 2500 |

EXAMPLE 4

This example employs a formulation used in the extrusion of plastic pipe. In the example, the calcium salt of mono-$C_{20+}$-alkyl succinate shows longer fusion time and lower torque than the calcium stearate control. This is characteristic of a lubricant with higher efficiency. It also shows processing efficiency which is equivalent to that of calcium stearate when used at a much lower overall lubricant concentration.

| Formulation | A | C | E |
|---|---|---|---|
| PVC resin | 100.0 | 100.0 | 100.0 |
| $TiO_2$ | 1.0 | 1.0 | 1.0 |
| Coated $CaCO_3$, ground | 1.5 | 1.5 | 1.5 |
| Methyl tin stabilizer | 0.4 | 0.4 | 0.4 |
| 160° m.p. Paraffin | 1.25 | 1.25 | 1.00 |
| Ca Stearate | .35 | — | — |
| Ca Mono-$C_{20+}$-alkyl succinate | — | 0.35 | 0.35 |

| Test Results | | | |
|---|---|---|---|
| B. PVC Stability Test | | | |
| Fusion Time (min.) | 5.25 | 7.5 | 5.0 |
| Torque after 10 min. | 2550 | 2100 | 2400 |
| D. PVC Stability Test | | | |
| Fusion time (min.) | 3.5 | 7.0 | 4.5 |
| Max. torque (MG) | 2350 | 2100 | 2350 |
| Torque after 10 min. | 2250 | 1925 | 2150 |
| Early color (min.) | 15–20 | 15–20 | 10–15 |
| Final color (min.) | 20–25 | 15–20 | 25–20 |

EXAMPLE 5

This example also employs a formulation used in the extrusion of plastic pipe. It is an additional demonstration of the improved internal lubricating capability of calcium mono-$C_{22+}$-alkyl succinate. Longer fusion times and lower torques can be seen from the experimental results.

| Formulation | D | E |
|---|---|---|
| PVC resin | 100.0 | 100.0 |
| $TiO_2$ | 1.0 | 1.0 |
| Coated $CaCO_3$, ground | 1.5 | 1.5 |
| Methyl tin stabilizer | 0.4 | 0.4 |
| 158° m.p. Paraffin | 1.1 | 1.1 |
| Ca Stearate | 0.4 | — |
| Ca Mono-$C_{22+}$-alkyl succinate | — | 0.4 |

| Rest Results | | |
|---|---|---|
| D. PVC Stability test | | |
| Fusion time (min.) | 3.25 | 12.0 |
| Max. torque (MG) | 2850 | 2000 |
| Torque after 10 min. | 2450 | 2000 |

EXAMPLE 6 AND 7

Examples 6 and 7 show additional experiments with calcium mono-$C_{20+}$-alkyl and mono-$C_{20+}$-alkyl esters of succinic acid in injection molding formulations. In both cases the salts are costabilizing, although not to the extent that calcium stearate is. They are more efficient lubricants demonstrating longer fusion times and lower torques. In addition, a lower amount of power (amperes) is required for mastication of the plastic. Better mold filling is observed at equal ram pressure.

| Formulation | Ex.6 | Ex.7 | Comp. A | Comp. B |
|---|---|---|---|---|
| PVC resin | 85.0 | 85.0 | 85.0 | 85.0 |
| Acrylic impact modifier | 15.0 | 15.0 | 15.0 | 15.0 |
| Methyl tin stabilizer | 2.0 | 2.0 | 2.0 | 2.0 |
| Acrylic processing aid | 2.0 | 2.0 | 2.0 | 2.0 |
| $TiO_2$ | 3.0 | 3.0 | 3.0 | 3.0 |
| 158° m.p. Paraffin | 0.2 | — | — | — |
| Oxidized polyethylene | — | — | 0.2 | — |

-continued

| Formulation | Ex.6 | Ex.7 | Comp. A | Comp. B |
|---|---|---|---|---|
| Ca Stearate | — | — | 1.8 | 0.2 |
| Stearyl Stearate | — | — | — | 1.8 |
| Ca Mono-$C_{22+}$-alkyl succinate | 1.8 | — | — | — |
| Ca Mono-$C_{20+}$-alkyl succinate | — | 2.0 | — | — |

| Test Results | Ex.6 | Ex.7 | Comp. A | Comp. B |
|---|---|---|---|---|
| B. PVC Powder Fusion Test | | | | |
| Fusion time (min.) | 1.5 | 2.0 | 0.8 | 0.5 |
| Max. torque (MG) | 2350 | 2300 | 2750 | 2850 |
| Torque after 10 min. | 2300 | 2250 | 2550 | 2450 |
| E. PVC Stability Test | | | | |
| Initial color development | 20–25 | 20–25 | 20–25 | 15°20 |
| Final time to stable color | 20–25 | 25–30 | 30–35 | 20–25 |
| Time to stable torque (min.) | 23.5 | 26 | 33 | 21 |
| Injection Molding Test | | | | |
| Amp. Input required at 48 rpm | 3.5 | 3.6 | 3.8 | 3.5 |
| Flow length at 1500 psi (in.) | 8.25 | 7.88 | 7.06 | 7.44 |
| Weld line strength lb/in$^2$* | 6715 | 6810 | 6740 | 6725 |
| Elongation | 20% | 10% | 10% | 40% |

*These are averages of three tests.

The injection molding test is a modification of the Standard Spiral Flow Test employing an ASTM mold.

EXAMPLE 8

This example employs a chlorinated polyvinyl chloride (Rhodia, Inc.-CPVC 1165) and demonstrates the increased efficiency of Calcium Mono-$C_{20+}$-alkyl Succinate by delay of fusion time, as compared with Ca Stearate.

| Formulation | A | C |
|---|---|---|
| Chlorinated PVC resin | 100.0 | 100.0 |
| Stabilizer for PVC processing (Ferro 889-Ferro Corp. | 2.0 | 2.0 |
| Oxidized polyethylene | 1.0 | 1.0 |
| Acrylic processing aid | 2.0 | 2.0 |
| Chlorinated polyethylene (Dow CPE 3614-Dow Chemical) | 9.0 | 9.0 |
| Ca Stearate | 1.0 | — |
| Ca Mono-$C_{20+}$-alkyl succinate | — | 1.0 |

| Test Results | A | C |
|---|---|---|
| F. PVC Stability Text | | |
| Fusion time (min.) | 1.4 | 1.7 |
| Max. torque (MG) | 3350 | 3500 |
| Torque after 10 min. | 3150 | 3150 |
| Stability time (min.) Initial color development | 35–40 | 35–40 |

EXAMPLE 9

Improved Lubrication of Phenoplasts

This example deals with phenol/formaldehyde resins. The use of Calcium Mono-$C_{22+}$-alkyl succinate provides longer flow duration, longer time to cross-linking and lower torque at maximum flow than can calcium stearate or other currently commonly used lubricants.

All compounds were prepared in a similar manner, by milling on a two-roll mill for approximately one minute with mill roll temperature of 200° F. on the front roll and 250° F. on the back roll. The milled sheet were granulated by smashing with a mallet, and sieving through a #8 screen.

| Formulation | A | J |
|---|---|---|
| Phenol/formaldehyde resin | 44.0 | 44.0 |
| Wood flour | 44.0 | 44.0 |
| Carbon black | 2.0 | 2.0 |
| Calcium oxide | 2.0 | 2.0 |
| Hexamethylene diamine | 6.0 | 6.0 |
| 160° m.p. Paraffin | 0.5 | 0.5 |
| Ca Stearate | 1.5 | — |
| Ca Mono-$C_{22+}$-alkyl succinate | — | 1.5 |

| Test Results | A | J |
|---|---|---|
| G. Evaluation of Thermosets | | |
| Time to start crosslinking (min.) | 0.875 | 1.25 |
| Max. flow duration (min.) | 0.375 | 0.75 |
| Torque at max. flow (MG) | 1250 | 350 |
| Time to crosslinking (min.) | 1.06 | 2.625 |
| Max. torque during crosslinking (MG) | 2100 | 2200 |

The preceding specific embodiments are illustrative of the practice of the invention. It is to be understood, however, that other expedients known to those skilled in the art or disclosed herein may be employed without departing from the spirit of the invention and the scope of the appended claims.

We claim:

1. A plastic composition with an improved external lubricant comprising (a) a polymer selected from the group consisting of phenoplasts and chlorine-containing thermoplastic polymers and (b) a calcium salt of a monoalkyl ester of a dicarboxylic acid where said monoalkyl contains more than 18 but less than 72 carbon atoms and said dicarboxylic acid is selected from the group consisting of succinic acid, glutaric acid, phthalic acid, terephthalic acid and isophthalic acid, where the proportion by weight of said calcium salt to said polymer is from 0.05 to 10.0:100.

2. The plastic composition of claim 1 wherein said proportion by weight of said calcium salt to said polymer is from 0.1 to 3.0:100.

3. The plastic composition of claim 1 wherein said polymer is a chlorine-containing thermoplastic polymer.

4. The plastic composition of claim 3 wherein said chlorine-containing thermoplastic polymer is a member selected from the group consisting of polyvinyl chloride, a copolymer of vinyl chloride and at least one other monoethylenically-unsaturated monomer copolymerizable with vinyl chloride, chlorinated polyvinyl chloride, chlorinated polyethylene, mixtures of polyvinyl chloride with polymers derived from non-chlorine-containing ethylenically unsaturated monomers and mixtures of said copolymer of vinyl chloride and at least one other mono-ethylenically-unsaturated monomer with polymers derived from non-chlorine-containing ethylenically-unsaturated monomers.

5. The plastic composition of claim 3 wherein said chlorine-containing thermoplastic polymer is polyvinyl chloride.

6. The plastic composition of claim 1 wherein said polymer is a phenoplast.

7. The plastic composition of claim 6 wherein said phenoplast is a phenol/formaldehyde resin in the A or B stage.

8. The plastic composition of claim 1 wherein said calcium salt is the calcium salt of the half ester of eicosanol with succinic acid.

9. The plastic composition of claim 1 wherein said calcium salt is the calcium salt of the half ester of docosanol with succinic acid.

10. The plastic composition of claim 1 wherein said calcium salt is the calcium salt of the half ester of eicosanol with phthalic acid.

11. The plastic composition of claim 1 wherein said calcium salt is the calcium salt of the half ester of docosanol with phthalic acid.

12. The plastic composition of claim 1 wherein said calcium salt is the calcium salt of the half ester of eicosanol with isophthalic acid.

13. The plastic composition of claim 1 wherein said calcium salt is the calcium salt of the half ester of docosanol with isophthalic acid.

14. The plastic composition of claim 1 wherein said calcium salt is the calcium salt of the half ester of eicosanol with terephthalic acid.

15. The plastic composition of claim 1 wherein said calcium salt is the calcium salt of the half ester of docosanol with terephthalic acid.

16. A process for shaping a polymer selected from the group consisting of phenoplasts and chlorine-containing thermoplastic polymers by incorporating from 0.05% to 10% by weight of a calcium salt of a monoalkyl ester of a dicarboxylic acid where said monoalkyl contains more than 18 but less than 72 carbon atoms and said dicarboxylic acid is selected from the group consisting of succinic acid, glutaric acid, phthalic acid, terephthalic acid and isophthalic acid, into said polymer prior to effecting its shaping.

* * * * *